United States Patent
Kujawa et al.

(10) Patent No.: US 9,225,805 B2
(45) Date of Patent: Dec. 29, 2015

(54) SELECTIVELY ORDERED PROTOCOL FOR UNRELIABLE CHANNELS

(75) Inventors: Michael Kujawa, Canton, MA (US); Todd Berkebile, San Francisco, CA (US)

(73) Assignee: Turbine, Inc., Westwood, MA (US)

( * ) Notice: Subject to any disclaimer, the term of this patent is extended or adjusted under 35 U.S.C. 154(b) by 1712 days.

(21) Appl. No.: 12/198,634

(22) Filed: Aug. 26, 2008

(65) Prior Publication Data
US 2008/0313346 A1  Dec. 18, 2008

Related U.S. Application Data

(62) Division of application No. 11/251,301, filed on Oct. 15, 2005.

(51) Int. Cl.
*H04L 29/06* (2006.01)
*H04L 12/801* (2013.01)

(52) U.S. Cl.
CPC ............... *H04L 69/16* (2013.01); *H04L 47/10* (2013.01); *H04L 67/38* (2013.01); *H04L 69/164* (2013.01)

(58) Field of Classification Search
None
See application file for complete search history.

(56) References Cited

U.S. PATENT DOCUMENTS

| | | | |
|---|---|---|---|
| 5,673,265 A | 9/1997 | Gupta et al. | |
| 6,621,796 B1 | 9/2003 | Miklos | |
| 6,785,285 B1 | 8/2004 | Romana et al. | |
| 6,944,127 B1 * | 9/2005 | Burchfiel et al. | 370/235 |
| 7,006,500 B1 | 2/2006 | Pedersen et al. | |
| 2002/0131425 A1 * | 9/2002 | Shalom | 370/401 |
| 2002/0186661 A1 | 12/2002 | Santiago | |
| 2003/0177187 A1 * | 9/2003 | Levine et al. | 709/205 |
| 2003/0204565 A1 * | 10/2003 | Guo et al. | 709/205 |
| 2005/0163066 A1 | 7/2005 | Gerakoulis | |
| 2005/0192098 A1 | 9/2005 | Guo et al. | |
| 2005/0207345 A1 | 9/2005 | Onggosanusi et al. | |
| 2006/0039380 A1 | 2/2006 | Cloonan et al. | |
| 2006/0126665 A1 | 6/2006 | Ward et al. | |

FOREIGN PATENT DOCUMENTS

| | | |
|---|---|---|
| WO | 01/54370 | 7/2001 |
| WO | WO01/54370 | 7/2001 |

OTHER PUBLICATIONS

Patent Cooperation Treaty, *Invitation to Pay Additional Fees*, (Jul. 7, 2007), 10 pages.

* cited by examiner

*Primary Examiner* — Faruk Hamza
*Assistant Examiner* — Tito Pham
(74) *Attorney, Agent, or Firm* — Occhiuti & Rohlicek LLP

(57) ABSTRACT

A method for communicating in a distributed game system includes, at a server system, maintaining information associated with a plurality of entities in an environment; and maintaining communication sessions between the server system and a plurality of client systems for exchanging information associated with the entities between the server system and the plurality of client systems. Each such communication session uses a communication protocol that supports both reliable transmission of ordered messages, and transmission and selective discarding of ephemeral messages.

13 Claims, 7 Drawing Sheets

SELECTIVELY ORDERED PROTOCOL FOR UNRELIABLE CHANNELS

RELATED APPLICATION

This application is a divisional of and claims the benefit of the priority date of U.S. application Ser. No. 11/251,301, filed Oct. 14, 2005. The contents of that application are incorporated herein by reference.

FIELD OF THE INVENTION

This invention relates to communication on unreliable channels in which data can be selectively ordered.

BACKGROUND

Communication on the Internet largely makes use of one of two transport layer protocols that are layered on the Network Layer Internet Protocol (IP), which provides basic host addressing and routing functionality for packet communication. The Transmission Control Protocol (TCP) supports reliable and in-order delivery of packets on a communication session. The User Datagram Protocol (UDP) supports an unreliable datagram protocol between specified ports. Other transport layer protocols have been built layered on or implemented using UDP, for example, the Real-Time Transport Protocol (RTP), which supports features such as sequence numbering and delivery monitoring but not full reliable in-order delivery as in TCP.

SUMMARY

In one aspect, the invention features a method for communicating in a distributed game system. Such a method includes, at a server system, maintaining information associated with a plurality of entities in an environment; and maintaining communication sessions between the server system and a plurality of client systems for exchanging information associated with the entities between the server system and the plurality of client systems. Each such communication session uses a communication protocol that supports both reliable transmission of ordered messages, and transmission and selective discarding of ephemeral messages.

In some practices, the server system is hosted on a plurality of server computers, and each of the communication sessions is associated with a channel identifier that is independent of which of the server computers is handling the communication session. Among these practices are those that include migrating at least some of the communication sessions among the server computers.

Other practices of the invention include, for each of the entities in the environment, maintaining a data structure that includes data identifying client systems to which information associated with the entity is to be sent. Among these practices are those in which the data structure for each of the entities includes communication—sequencing data associated with each of the client systems to which the information is to be sent, and those that include receiving information associated with one of the entities from a client system; and forwarding the received information to the client systems identified in the data structure for that entity. Also included among these practices are those in which the server system is hosted on a plurality of server computers, and each of the entities is hosted on one of the server computers, and in which maintaining the data structure for a particular entity includes maintaining the data structure on the server computer hosting the particular entity. Alternative practices include migrating an entity from being hosted on one of the server computers to another of the server computers, including passing the data structure for the entity from the one of the server computers to the other of the server computers.

Other aspects of the invention feature computer-readable media having encoded thereon software for executing any of the foregoing methods, and server systems configured to execute any of the foregoing methods.

DESCRIPTION

Figure 1:
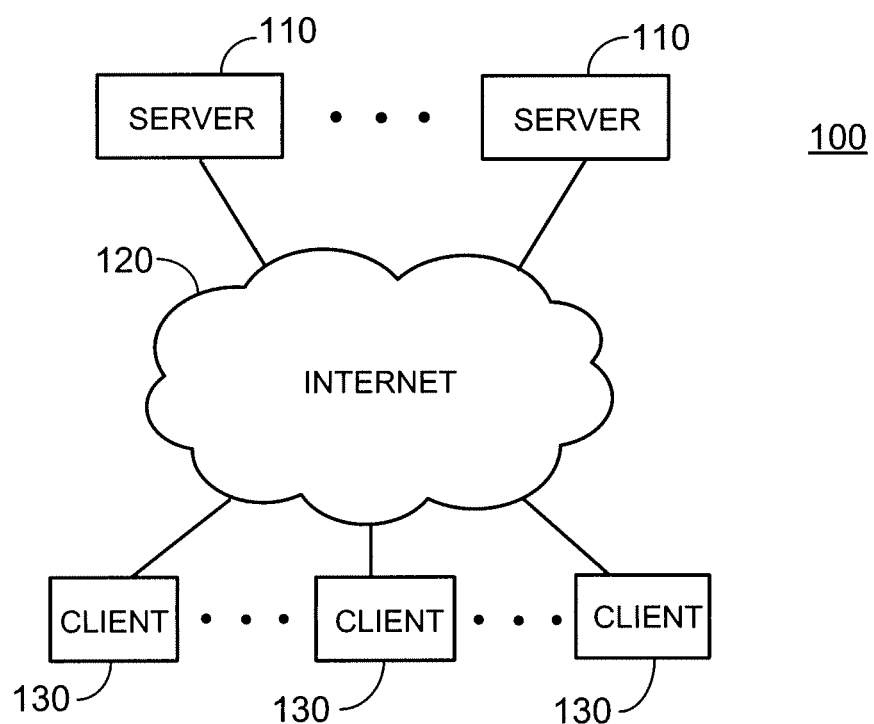
FIG. 1 is a block diagram of a distributed system.

Referring to FIG. 1, a distributed system 100 includes a number of server computers 110 (generally "servers") communicate over a data network, here the Internet 120, with a number of client computers 130 (generally "clients"). In one example, this system is used to host a multiplayer game in which each client computer hosts a different user, and each user controls one or more characters or other objects in the game. The server computers 110 receive information from the client computers 130 to update the state of the game, and distribute information back to the client computers 130 regarding relevant game state for each of the clients.

Various types of information are sent from the server to the clients. For example, control information is exchanged between a client and the servers regarding state of a user's characters. State of the game is sent to the clients as needed. For example, when an object first enters the relevant environment of a user's character, a server handling that object sends information about that object, for example as needed by the client to render the object. As the state of that object changes, the server sends updates for the objects state to clients.

Different types of information sent from the servers to the clients can have different delivery requirements. For example, some data sent from the server must be delivered reliably and in order to the client. For example, information related to control of a user's character may fall in this category. Other information is ephemeral. For example, information updating the state of an object is not delivered in time may be superseded by later state information about that object. Some information may have an initial portion that must be sent in order, for example, an initial specification of an object, which later information can be ephemeral.

Figure 2:
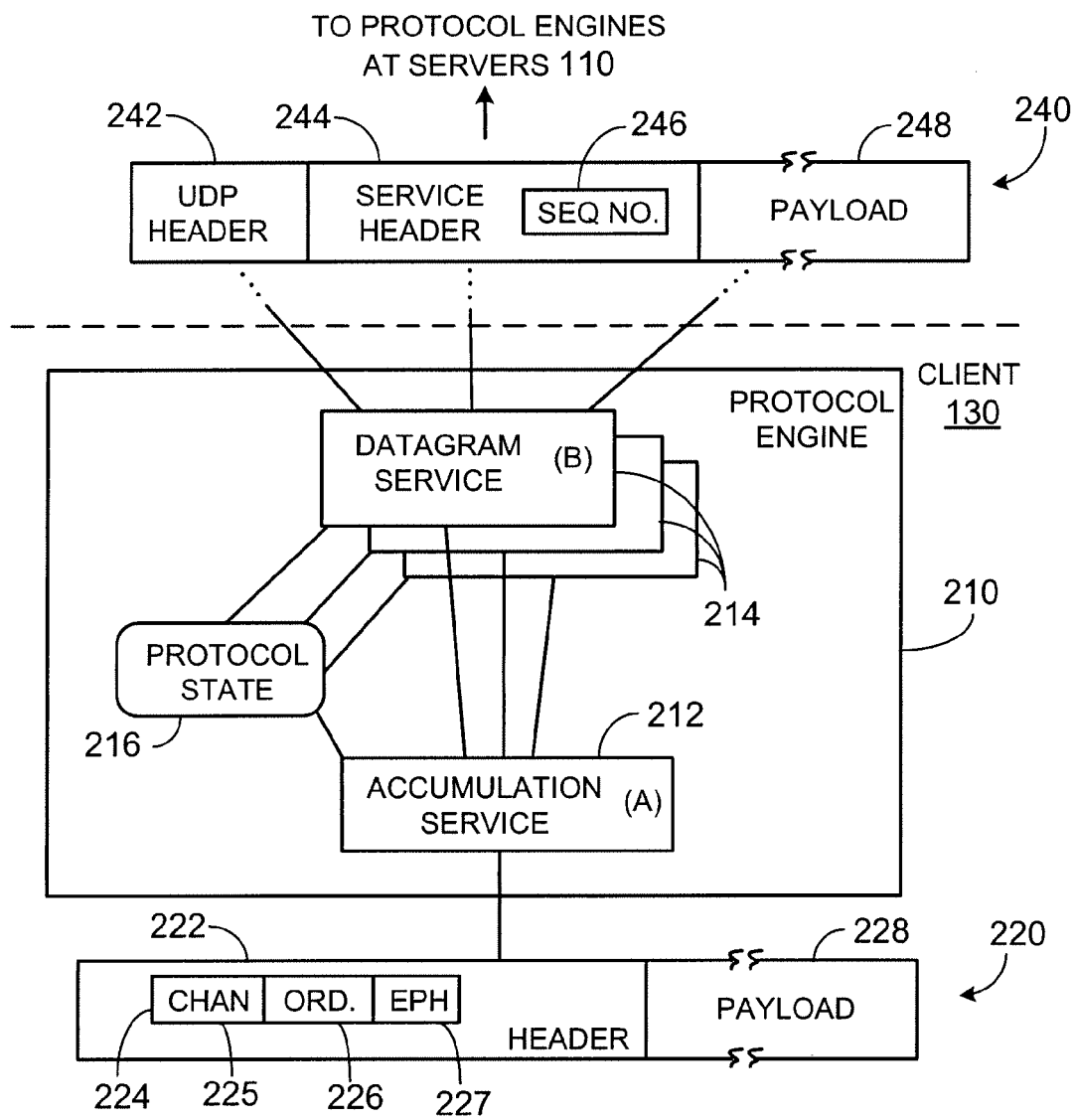
FIG. 2 is a block diagram of a protocol engine.

Referring to FIG. 2, at each of the servers 110 and clients 130, a protocol engine implements a packet-based communication protocol for passing information between the clients and servers. In FIG. 2, a representative protocol engine 210 supports communication between one or more software modules executing at a client 130 and one or more servers 110. The protocol engine is bidirectional supporting both communication from the servers to the client as well as communication from the client to the servers. For illustration, the discussion below focuses on server-to-client communication.

The information passed from a server to the client is made up of messages (or equivalent data structures or packets or interfaces that transfer equivalent information). Each such message 220 includes a payload 228 as well as a header 222. The header has sequencing data 224 that is used by the protocol engine. This sequencing data 224 includes a triple of a channel identifier 225 (abbreviated chan), and ordering index 226 (abbreviated ord), and an ephemerality index 227 (abbreviated eph).

Before continuing with a description of the protocol engine 210, logical properties of the transport of the messages 220 from server to client (or back) is discussed with reference to FIG. 3A. Messages are delivered according to rules that depend on the ordering index and ephemerality index of the messages. The messages with different channel identifiers are delivered logically independently of one another. Logically, messages are delivered reliably from one protocol engine to another, but possibly with variable delay due, for example, to delay in transit over the network, or due to retransmission of lost or corrupted messages.

Figure 3A:
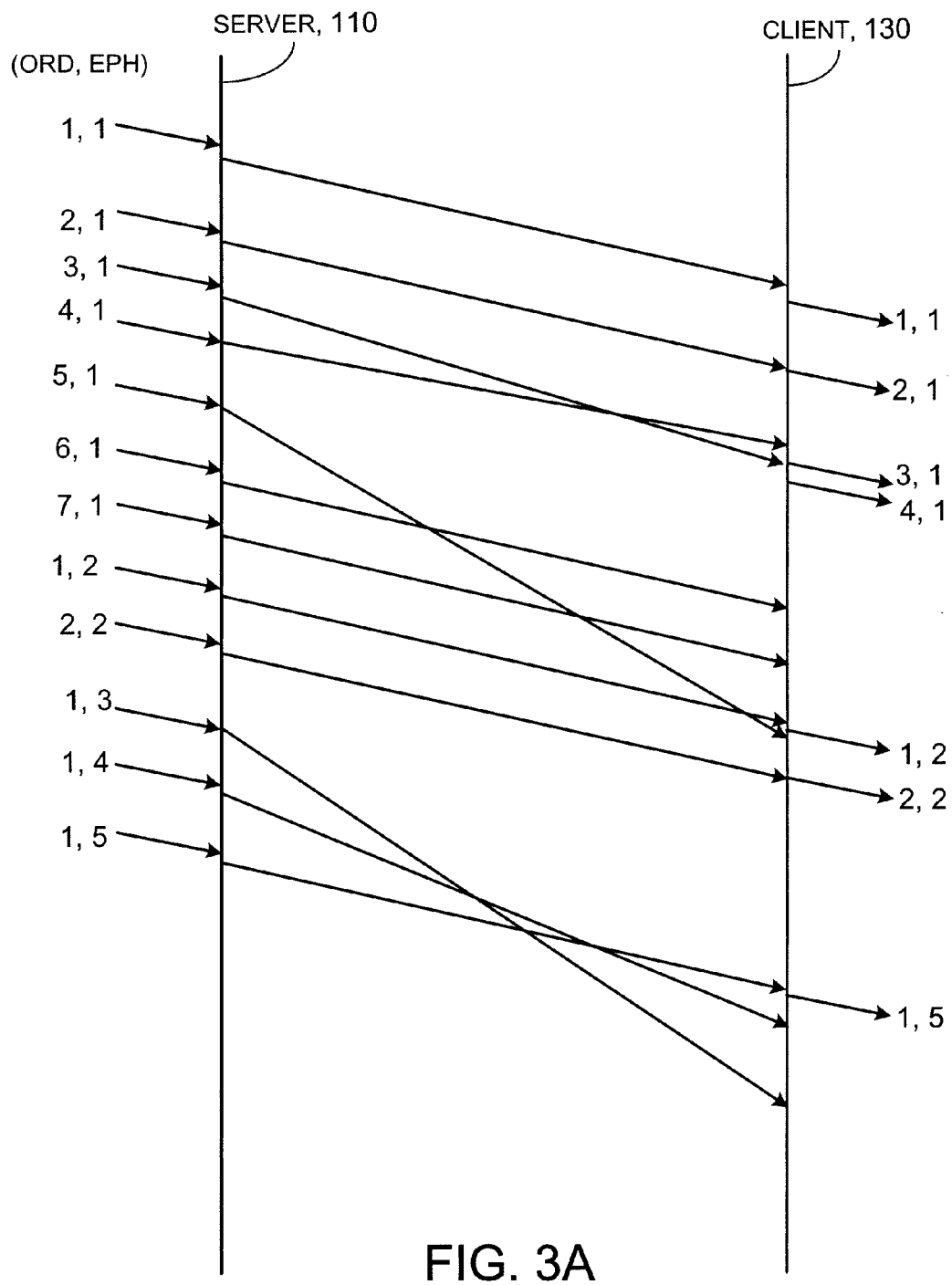
FIGS. 3A-B are timing diagrams that illustrates a selectively ordered communication protocol.

FIG. 3A shows a example of a series of messages 220 all with the same channel identifier. A first sequence of messages have eph=1, and ord incrementing starting at one. Such messages, if delivered, are delivered in order to their destination. In the example, a message with (ord, eph)=(1,1) is sent followed by message (2,1). These messages arrive in order at the client and pass immediately through the protocol engine. The next two messages (3,1) and (4,1) are sent in order, but arrive our of order. The protocol engine buffers (4,1) until (3,1) arrives, at which time (3,1) and then (4,1) are delivered. Similarly, (5,1), (6,1), and (7,1) are sent in order, but (5,1) is delayed, and therefore (6,1) and (7,1) are held at the protocol engine pending arrival of (5,1).

For each particular channel identifier, the ephemerality index increments, with subsequences of one or more messages being sent for each ephemerality index. At the receiving protocol engine, once a message at a particular ephemerality index is received, messages for that channel identifier with lower ephemerality index that are pending delivery or are received later are not delivered from the protocol engine (or alternatively, are optionally delivered).

In the example of FIG. 3A, after (7,1) is sent, the next message is (1,2), which represents an increment in the ephemerality index. When (1,2) is received at the client, (6,1) and (7,1) are pending delivery, and are discarded. Message (5,1) arrives after (1,2) and is therefore discarded when it arrives. Message (2,2) is sent and delivered in sequence after (1,2). Messages (1,3), (1,4) and (1,5) are sent in sequence, but delivery of (1,3) is delayed. When message (1,5) arrives at the client, it is delivered immediately because it has a higher ephemerality index than previous messages, and has a ordering index of 1. Because the ordering index is 1, there are no missing messages with the same ephemerality index that need to be waited for. When messages (1,3) and (1,4) arrive after (1,5), they are discarded.

Referring back to FIG. 2, the protocol engine 210 is implemented in two stages. An accumulation service 212 provides the interface that provides or accepts messages 220 that specific the channel identifier, ordering index, and ephemerality index. The accumulation service 212 is responsible, for example, for delaying delivery of messages that arrive out of order and discarding messages that arrive too later for delivery.

Transport of messages 220 makes use of one or more reliable datagram services 214. In this version of the system, this reliable datagram service is layered on the unreliable User Datagram Protocol (UDP). For each remote destination, a separate service 214 coordinates transmission, acknowledgment, and retransmission of packets for that destination. For outbound messages, the service fragments or aggregates messages 220 into transmission packets 240 and keeps track for each transmission which one (or which set) of the messages 220 are transported in the transmission packet. For example, a large payload 228 may have to be broken down into a number of different transmission packets 240. Conversely, a set of small payloads 228 may be aggregated into a single transmission packet. The association of messages 220 and transport packets 240 (i.e., between the triple (chan, ord, eph) and transport sequence number) is maintained by the datagram service in a protocol state 216 of the protocol engine.

The datagram service 214 implements reliable delivery of each transmission packets. Each transmission packet 240 is assigned a different sequential sequence number 246. If a transmission packet with a particular sequence number is not received at its destination, that sequence number is sent again. The sequence number may be sent again by retransmission of the entire transmission packet 240. However, as an optimization to reduce communication, which is discussed further below, the datagram service 214 may omit the payload if there is no data that is needed at the destination, for example, because all the data that would be sent has a lower ephemerality index than already received at the destination. As a further optimization, rather than sending an empty payload in a separate transmission packet, the sequence number can be piggybacked in the header of another transmission packet being sent to the destination. Therefore, each sequence number is ultimately accounted for at the destination, but some sequence number are finally received without their corresponding payloads.

Figure 3B:
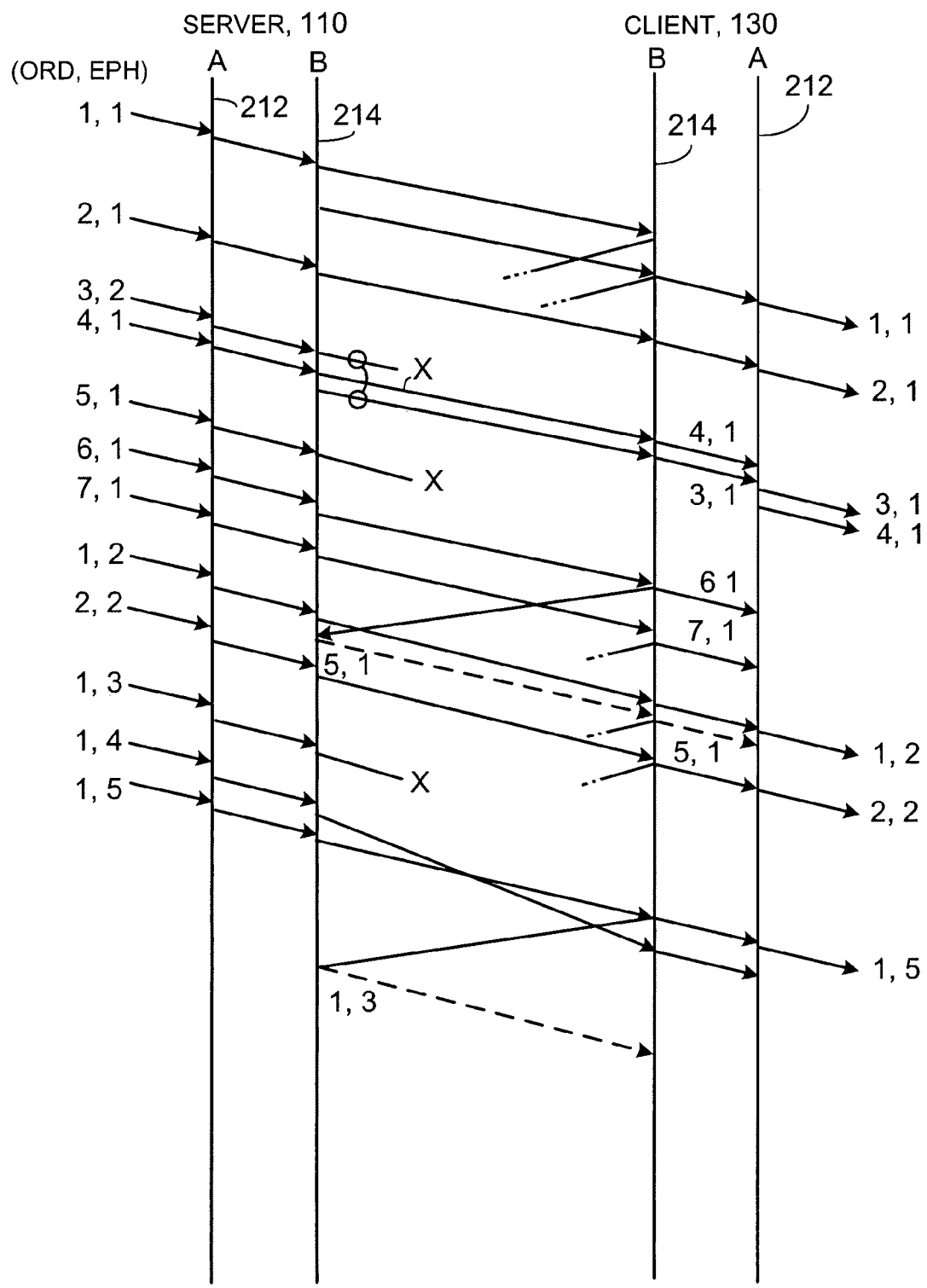

Referring to FIG. 3B, in a series of messages corresponding to those shown in FIG. 3A, communication between the accumulation service 212 (A) and the datagram service 214 (B) at each of the server 110 and the client 130 are shown, as well as the communication between the datagram services 214 at the client and server.

In FIG. 3B, the first message 220 (1,1) passes from the accumulation service to the datagram service, where in this example, the payload is fragmented into two separate datagrams, which are sent in order. In this example, these datagrams have sequential serial numbers (not indicated in the figure). The receiving datagram service acknowledges the receipt of the datagrams, for example, by sending dedicated acknowledgment packets or sending acknowledgements piggybacked in the headers of datagrams passing in the reverse direction. The following message (2,1) is illustrated as being sent in a single datagram. The message (3,1) is also shown as being sent in a single datagram, but the datagram does not reach its destination. The message (4,1) is also sent in a single datagram, and when the client datagram service receives the datagram, it send a negative acknowledgment for the datagram that carried the (3,1) message. The client datagram service passes the (4,1) message to the accumulation service, which holds the message pending receipt of the (3,1) message to allow in-order delivery. After receiving the negative acknowledgment (or in some cases as a result of a timeout) the server's datagram service resends the datagram carrying the (3,1) message. When the client's datagram service receives the datagram, it sends the (3,1) message to the accumulation service which then delivers (3,1) and (4,1) in order. Therefore, from the point of view of the accumulation service, the (3,1) message was delayed, but the accumulation service does not need to deal with the retransmission aspects of the lower-level protocol.

In some cases, the transmitting datagram service can determine that the payload for datagram that was transmitted but not successfully received does not contain any part of a message that is still needed at the receiving accumulation service, and therefore the entire payload of the datagram can be omitted, or a introduced above, the datagram can be "sent" as part of a header of another datagram passing to the client. In the example shown in FIG. 3B, messages (5,1), (6,1), and (7,1) are sent in order, each in a single transport datagram. The datagram carrying (5,1) is lost. By the time the sending datagram service has determined that the receiving datagram service did not receive the datagram carrying (5,1), the sending datagram service has already sent (2,1). Therefore, rather than sending the payload for (5,1) again, only to have it dropped by the destination accumulation service, the sending datagram service effectively drops the payload for (5,1) before even sending it. Similarly, in the example, message (1,3) is lost, and by the time the negative acknowledgement of (1,3) is received, the sending datagram service has already sent (1,5) and therefore the payload for (1,3) does not have to be sent.

Another aspect of the protocol engine is that for a particular channel of accumulation messages, different servers may provide the source of messages over time. For example, the server responsible for sending messages on a particular channel can migrate from server to server. At the receiving protocol engine, such migration corresponds to different datagram services receiving the transport packets. However, the accumulation service can be entirely or largely insensitive to such changes and can continue to deliver messages for that channel regardless of which server they came from.

Figure 4:
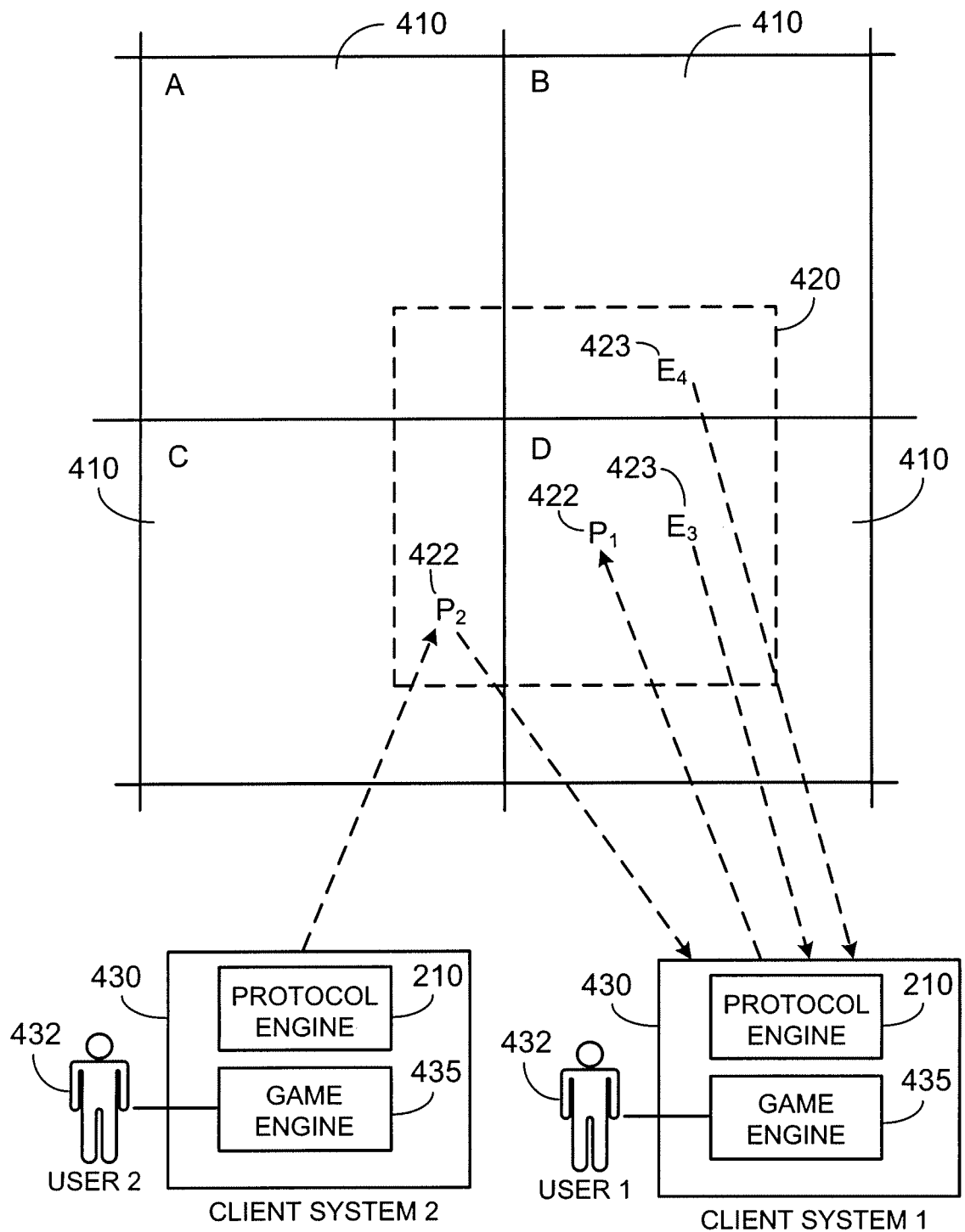
FIG. 4 is a logical block diagram of portions of a multiplayer game system.

The communication approaches described above is applied, for example, in a multiplayer game system. Referring to FIG. 4, each user 432 of the game interacts with a client system 430 hosted on a client computer 130 (see FIG. 1, not shown in FIG. 4) and controls a player 422 (e.g., players P1 and P2 controlled by 1 and 2, respectively) that exist in a virtual environment (a "world"). A number of server computers 110 (see FIG. 1, not shown in FIG. 4) together host a server system. The server system accepts information from the client systems, for example, regarding each user's manipulation of their respective player. The server system provides to each user information regarding other users' players and other dynamic events in the virtual environment. In this way, each client system is aware of relevant actions by other users' players and relevant dynamic events, such as motion of non-player elements such as doors etc. Note that in alternative versions of the system, it is not necessary that each client system support only a single user or a single player under control of the user or users at that client system.

As illustrated in FIG. 4, the virtual environment is partitioned into a number of blocks 410, each associated with a different region of the environment. For example, in a three-dimensional environment, each block may be associated with a horizontal tile and the region above (and below) that tile. Other, for example irregular, partitioning of the environment is also supported.

FIG. 4 shows two users 432 of a potentially very large number of users (e.g., 100, 1000, 10000, 100000, 1000000, or more). Each of these users interact with the server system on which the virtual world is hosted. In the illustration, user 2 controls a player P2, which is located in block C of the environment, while user 1 controls player P1, which is located in a different block D of the environment. Other dynamic elements 423, illustrated as E3 and E4 are also present in blocks of the environment. Much of the server handling of players and dynamic elements is similar, and for the sake of discussion below, the term "entity" is generally used to generically include players and dynamic elements.

Each player is associated with an area of interest (AOI) in the virtual world. For example, such an area of interest can be associated with the region of the environment that is potentially viewable by the player. For example, AOI 420 illustrated in FIG. 4 is associated with player Pt. Information about the entities in the area of interest may be needed to render a graphical representation of the environment from the player's perspective. Note that each user and the server system are preconfigured (or updated on an ongoing basis using another data distribution mechanism) with data representing static elements of the environment, and therefore each user only requires information about the dynamic entities in its corresponding AOI in order to render an up-to-date version of the environment. Note also that in FIG. 4, the AOI 420 is represented as a rectangle. Other shapes, for example, dependent on characteristics of the virtual environment (e.g., presence of vision-obstructing barriers such as walls) or characteristics of the player may affect the size or shape of the player's AOI. Note also that the AOI for a player can include multiple blocks of the environment.

During play of the game, the server system receives information from the client systems related to their respective players. For example, in FIG. 4, the server system receives information related to player P2 from client system 2. This information includes position information that relates to where in the environment the player has moved under the control of user 2, as well as other information about the state or characteristics of the player, such as whether the player has raised his arm, is running, etc. As the server system receives the information from users about their players, it sends that information back out to other users for whom that information is relevant. For example, in FIG. 4, the information received from client system 2 related to player P2 is sent to client system 1 because player P2 is in the AOI for player P1. The server system may also compute changes in dynamic elements 423 as a result of the information from the users, and information that characterize those changes is also sent to the users. For example, in FIG. 4, information related to dynamic elements E3 and E3 are sent to client system 1 because those elements are within the AOI for player Pt.

Generally, for each entity in the environment the server system maintains a list of client systems that are to receive information about changes in position or state of the entity. These lists are determined from the regions of interest for the respective users' players. As players and dynamic elements move, the list of client systems for any particular entity changes over time. For example, if a user's player moves far enough away from an entity such that the entity is no longer in the player's AOI, the user's client system no longer needs to receive information about that entity. Similarly, if a user's player approaches an entity such that the entity enters the player's AOI, the user's client system should begin to receive information about that entity.

The server system communicates with the client systems using the communication approach described above. At each client system, a protocol engine 210 of a type described above provides a communication link to components of the server system typically hosted on multiple different server computers 110. The protocol engine exchanges messages with a game engine 435, which maintains data characterizing a portion of the virtual environment, and which interacts with the user 432 by accepting instructions that manipulate the user's player in the virtual world. The game engine exchanges messages of the format of message 220 shown in FIG. 2. Specifically, the messages include (chan, ord, eph) triples that are used to control ordering and ephemerality of inbound and outbound messages.

Figure 5:
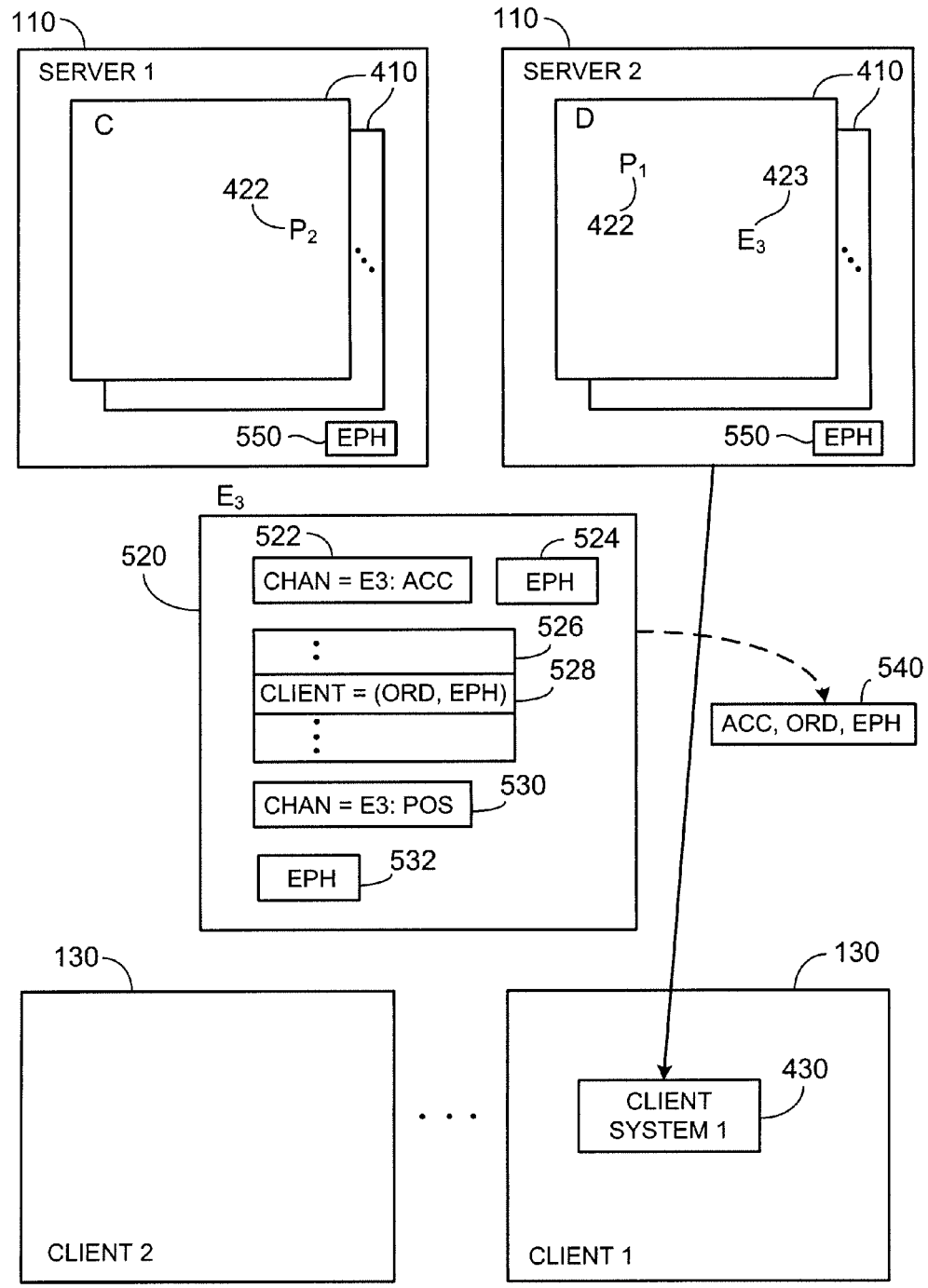
FIG. 5 is a system block diagram of portions of a multiplayer game system.

Referring to FIG. 5, multiple server computers 110 that host the server system each maintains information for one or more blocks 410 of the environment. Each such server typically maintains multiple blocks. The association of blocks and servers is not necessarily "geographic" and the server system supports migration of blocks between servers, for example, for load balancing. In FIG. 5, server 2 maintains block D, in which player P1 is found, as well as in which dynamic element E3, which is in player P1's AOI, is found. Player P1's AOI includes part of block C, which is maintained by server 1. Player P1 therefore has "visibility" to parts of the environment maintained on more than one server. During play, client system 1 receives information related to player P2 from server 1 and information related to dynamic element E3 from server 2. As is discussed further below, if player P2 were to move to block D (and server 2 continues to be responsible for maintaining block D), then server 2 would start to send information related to player P2 to client system 1, taking over from server 1.

For each entity in a block, the server maintaining that block has a data structure 520 that includes data encoding the current position and state of that entity. This data structure includes data used to identify and communicate with the client systems that are to received updates for that entity. For each entity in the environment and each such client system, the server system communicates information about that entity to the client system using the communication approach described above. In particular, for each entity, the server system uses multiple channels, include one channel for accumulated data, such as incremental state changes of entities, and one channel for ephemeral data, such as position updates for entities. For a particular entity, the server system keeps consistent channel identifiers for each entity independent of the block within which the entity is found or the server on which that block is maintained. That is, the channel identifiers do not change as entities move between servers. In FIG. 5, the two channel identifiers for entity E3 are shown as E3:ACC 522 for the accumulated data and E3:POS for the ephemeral (positional) data. The number of channel identifiers used for any particular entity is not necessarily limited to two in alternative versions of the system.

The accumulated data channels are used, for example, to send incremental information that is used by the client to track the state of the entity. For example, when an entity enters a player's AOI, the server begins by sending information to the user's client system that is sufficient to add that entity to the data for the environment at the user. For example, details of the entities characteristics (e.g., type, clothing, etc.) are sent to the client system. This information is sent to the user using the accumulated channel. This data may span many messages, all of which are needed in order by the user in order to properly build and maintain the state of the entity. In terms of the communication approach described above, this information is sent in a series of one or more messages with sequentially increasing ord index values and a constant eph index value. Further incremental changes to the state of the entity are sent on using this same channel identifier. For example, when a entity changes state, such as an arm position, incremental information is sent on that channel with further sequentially increasing ord values and constant eph value.

For a particular entity at the server (e.g., entity E3), different client systems typically have received different histories of the accumulated information, for example, because the entity has been in the corresponding players' AOIs for different durations. Therefore, the data structure 520 includes a table 526 in which each record 528 identified one user and a corresponding (ord, eph) pair of the current message being sent to the user on the accumulated channel for that client system.

Note that different client systems not only in general have different current ord values, they also have different current eph values. When the entity enters a AOI for a particular user, the server system assigns an eph value to the accumulated communication session to be used with that client system. When the entity later leaves the AOI for that user, the client system is removed from the table 526. If the entity later re-enters the AOI for that user, the server system begins by starting a new session with ord=1 and a new eph index value that is greater (taking into account wrapping of the finite-precision value) than the old value used before the entity previously left the AOI. In this way, if any of the old messages from before the entity left the AOI are delivered after the new messages sent after the entity re-entered the AOI, the old messages will be discarded. This situation could happen, for example, if an entity exits and the very soon thereafter re-enters the AOI. In order to assign the eph values as the entity enters the AOI of different users, a global eph value 532 for the entity is used and incremented whenever a user is added to the table 526.

As an example, when server 2 is to send an update of the state of entity E3 to client system 1, it consults the data structure 520 associated with E3, and locates the record 528 for that client system. It construct a message with the (chan, ord, eph) header 540 using the chan identifier 522 for the accumulated channel and the (ord, eph) pair from the client system's record 528, and then increments the ord value in that record.

Ephemeral data uses a common eph index value 532 for all client systems. For example, when a position update is to be sent to all the client systems in the table 526, the current eph index 532 is used with ord=1 for all the messages, and then the eph index value is incremented.

When an entity moves from one block to another, and the new block is on another server, the data structure 520 for that entity is passed to the new server. In this way, the communication sessions with client systems are continued using the next ord and/or eph values that would have been used had the entity remained in the previous block. From the point of view of the game engine 435 of the client system 430, the specific server sending the messages for that entity is not significant and the updating of the entity information continues as if the entity had not changed servers. For example, when the entity changes servers, the communication session coordinated using the ord and eph indices persists. More specifically, the communication is handled by a different datagram service 214 (see FIG. 2) in the protocol engine 210 when the entity migrates to a different server, but the accumulation service 212 (see FIG. 2) continues to handle the communication without interruption.

An entire block of the virtual environment can also migrate from server to server. When such a migration occurs, the data structures for all the entities in that block are passed to the new server.

Figure 6:
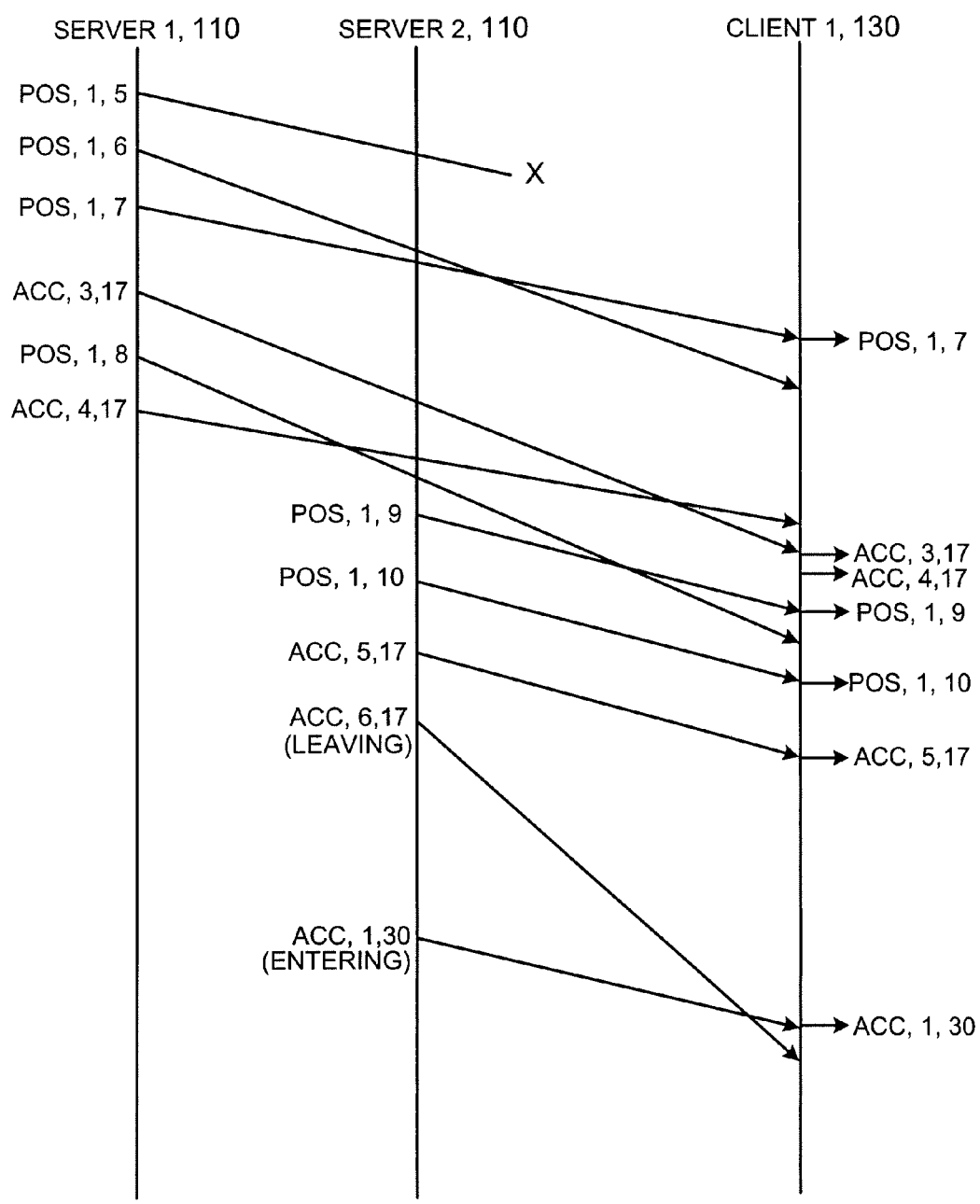
FIG. 6 is a timing diagram that illustrates communication for a multiplayer game system.

Referring to FIG. 6 an example of communication of information relates to an entity (e.g., player P2) that is initially at server 1 and then migrates to server 2. In the figure messages are labeled with two channel identifiers, "POS" being the ephemeral channel and "ACC" being the accumulated channel for that entity. A label (POS,1,5), for example, corresponds to (ord, eph)=(1,5) on the ephemeral channel. FIG. 6 illustrates messages for two different channel identifiers. Initially, the accumulated channel uses eph=17 and is currently at ord=3, while the ephemeral (position) channel is at eph=5.

The first message illustrated in the figure is a position update message (POS,1,5) sent from server 1 to client 1. This message is lost in transit (retransmission is not illustrated in the figure). The next messages (POS,1,6) and (POS,1,7) are both sent and reach the client, but (POS,1,7) arrives first. This message is delivered and used by the client to update the position of the entity. When the (POS,1,6) message arrives, it is discarded because it is older than the (POS,1,7) message. Next a state update message (ACC,3,17) is sent. This message is delayed relative to a later sent (ACC,4,17) message. When the (ACC,4,17) message arrives at the client, the (ACC,3,17) and then the (ACC,4,17) messages are used by the user in order to update the state of the entity. A position update message (POS,1,8) message is sent to the client from server 1. After this update is sent, the entity migrates to server 2 from which a (POS,1,9) message is sent. In this example, this message arrives at the client before the (POS,1,8) message. Therefore the (POS,1,8) message is discarded at the client. A state update message (ACC,5,17) is sent from server 2. Note that the state information is preserved through the transition between servers, and when the client receives the (ACC,5,17) message, it is passed to the user because the previous (ACC,4,17) message was already delivered. A next state update message, (ACC,6,17) is associated with the entity leaving the AOI for the client. Later, the entity re-enters the AOI, and the server assigns a new eph index, eph=30. In the illustrated example of FIG. 6, the first accumulated message after the entity re-entered, (ACC,1,30), arrives before the last accumulated message that was sent before the entity left the AOI. However, that earlier sent message has an earlier eph index, eph=17, and therefore this message is discarded at the client.

Not illustrated in FIG. 6 are acknowledgements and retransmissions associated with lost datagrams. The retransmission approach described earlier is implemented such that the server that originally sent a message is responsible for completing the delivery of the message. For example, in FIG. 6, the relatively late delivery of (POS,1,8) could be due to an initial transmission packets for the message being lost, with the retransmission of the message (possibly with an empty payload) possibly occurring even after the entity has migrated to server 2.

Communication from the clients to the server similarly make use of the communication approach described above, with one channel identifier being used for accumulated data, and a second identifier being used for ephemeral position data. When a player moves from server to server, the new server informs the client of the new destination to send the packets for that channel. The client migrates the communication with the server system to a new datagram service appropriate to the new server. Any messages received from the client at the old server are forwarded within the server system from the old server to the new server in order to continue the protocol without interruption.

It is to be understood that the foregoing description is intended to illustrate and not to limit the scope of the invention, which is defined by the scope of the appended claims. Other embodiments are within the scope of the following claims.

What is claimed is:

1. A method for communicating in a distributed game system, the method comprising:
    at a server system, maintaining information associated with a plurality of entities in an environment; and
    maintaining communication sessions between the server system and a plurality of client systems for exchanging information associated with the entities between the server system and the plurality of client systems, wherein each communication session uses a communication protocol that supports both:
        reliable transmission of ordered messages, and
        transmission and selective discarding of ephemeral messages based on ephemerality indices associated with said messages.

2. The method of claim 1, wherein the server system is hosted on a plurality of server computers, and each of the communication sessions is associated with a channel identifier that is independent of which of the server computers is handling the communication session.

3. The method of claim 2, further comprising migrating at least some of the communication sessions among the server computers.

4. The method of claim 1, further comprising:
    for each of the entities in the environment, maintaining a data structure that includes data identifying client systems to which information associated with an entity is to be sent.

5. The method of claim 4, wherein the data structure for each of the entities includes communication-sequencing data associated with each of the client systems to which the information is to be sent.

6. The method of claim 4, further comprising:
    receiving information associated with one of the entities from a client system; and
    forwarding the received information to the client systems identified in the data structure for that entity.

7. The method of claim 4, wherein the server system is hosted on a plurality of server computers, and each of the entities is hosted on one of the server computers, and wherein maintaining the data structure for a particular entity includes maintaining the data structure on the server computer hosting the particular entity.

8. The method of claim 7, further comprising migrating an entity from being hosted on one of the server computers to another of the server computers, including passing the data structure for the entity from the one of the server computers to the other of the server computers.

9. The method of claim 1, wherein the communication protocol supports transmission and selective discarding of ephemeral messages based on comparisons between ephemerality indices associated with said messages.

10. A non-transitory computer-readable medium having encoded thereon software for communicating in a distributed game system, the software comprising instructions for
    at a server system, maintaining information associated with a plurality of entities in an environment; and
    maintaining communication sessions between the server system and a plurality of client systems for exchanging information associated with the entities between the server system and the plurality of client systems, wherein each communication session uses a communication protocol that supports both:
        reliable transmission of ordered messages, and
        transmission and selective discarding of ephemeral messages based on ephemerality indices associated with said messages.

11. The medium of claim 10, wherein the communication protocol supports transmission and selective discarding of ephemeral messages based on comparisons between ephemerality indices associated with said messages.

12. A server system for supporting playing, by a plurality of clients, a distributed computer game, the system comprising:
    a processing subsystem;

a computer-readable medium in data communication with the processing subsystem, the computer-readable medium having encoded thereon software for communicating in a distributed game system, the software comprising instructions for maintaining, at the server system, information associated with a plurality of entities in an environment; and maintaining communication sessions between the server system and a plurality of client systems for exchanging information associated with the entities between the server system and the plurality of client systems, wherein each communication session uses a communication protocol that supports both:

reliable transmission of ordered messages, and transmission and selective discarding of ephemeral messages based on ephemerality indices associated with said messages.

13. The method of claim 12, wherein the communication protocol supports transmission and selective discarding of ephemeral messages based on comparisons between ephemerality indices associated with said messages.

* * * * *